US007688764B2

(12) United States Patent
Dorenbosch et al.

(10) Patent No.: US 7,688,764 B2
(45) Date of Patent: Mar. 30, 2010

(54) METHOD AND APPARATUS FOR SPEAKER ARBITRATION IN A MULTI-PARTICIPANT COMMUNICATION SESSION

(75) Inventors: Jheroen P. Dorenbosch, Paradise, TX (US); Steven D. Upp, Bartlett, IL (US); Thomas G. Hallin, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 2137 days.

(21) Appl. No.: 10/175,974

(22) Filed: Jun. 20, 2002

(65) Prior Publication Data

US 2003/0235184 A1 Dec. 25, 2003

(51) Int. Cl.
*H04L 12/16* (2006.01)
*H04L 12/66* (2006.01)
*H04L 12/28* (2006.01)
*H04J 3/16* (2006.01)
*G06F 15/16* (2006.01)

(52) U.S. Cl. .................. 370/260; 370/352; 370/401; 370/466; 709/204

(58) Field of Classification Search ......... 370/259–261, 370/352–356, 401, 466, 474, 389, 390, 392, 370/465, 469
See application file for complete search history.

(56) References Cited

U.S. PATENT DOCUMENTS

| 5,918,020 | A | 6/1999 | Blackard et al. |
|---|---|---|---|
| 6,275,471 | B1 | 8/2001 | Bushmitch et al. |
| 6,360,093 | B1 | 3/2002 | Ross et al. |
| 6,466,550 | B1 * | 10/2002 | Foster et al. ................. 370/261 |
| 6,798,755 | B2 * | 9/2004 | Lillie et al. .................. 370/312 |
| 7,058,042 | B2 | 6/2006 | Bontempi et al. |
| 7,170,863 | B1 * | 1/2007 | Denman et al. ............. 370/260 |
| 2003/0012149 | A1 * | 1/2003 | Maggenti et al. ............ 370/260 |
| 2004/0100987 | A1 * | 5/2004 | Marque-Pucheau ......... 370/447 |

FOREIGN PATENT DOCUMENTS

| WO | 0167675 A2 | 9/2001 |
|---|---|---|
| WO | 02085051 A1 | 10/2002 |

OTHER PUBLICATIONS

Gannoun, L.: "RTP Payload Format for X Protocol Media Streams; draft-ietf-avt-X11-new-00.txt", EURECOM, IETF Standard-Working-Draft, Internet Engineering Task Force, IETF, CH, vol. avt, Mar. 11, 1998, all pages.

* cited by examiner

*Primary Examiner*—Nittaya Juntima
(74) *Attorney, Agent, or Firm*—Steven A. May

(57) ABSTRACT

A communication system provides in-band speaker arbitration in a multi-participant communication session by use of RTP floor control messages that include a speaker arbitration command embedded in a data packet header extension.

25 Claims, 4 Drawing Sheets

METHOD AND APPARATUS FOR SPEAKER ARBITRATION IN A MULTI-PARTICIPANT COMMUNICATION SESSION

FIELD OF THE INVENTION

The present invention relates generally to Internet Protocol (IP) networks, and, in particular, to speaker arbitration in a multi-participant IP network communication session.

Background of the Invention

Wireless communication systems are well known in the art. In traditional wireless communication systems, real time services are typically implemented using a circuit switched infrastructure in conjunction with at least one dedicated wireless resource. However, a current trend in the industry is the use of packet switched infrastructures in support of wireless communications. For example, so-called 2.5 generation wireless technology provides for unprecedented access to the Internet via wireless devices in order to communicate data and voice. In communication systems that utilize a packet switched infrastructure, the Internet Protocol (IP) is becoming the standard for voice and data communications.

In voice over IP (VOIP) communication sessions, the messaging involved in a setup of the session commonly uses the Session Initiation Protocol (SIP) to setup the session and the Real Time Protocol (RTP) to provide real time exchange of voice data packets among session participants. SIP is an application-layer signaling protocol that can run on top of multiple different transport-layer protocols and is used for initiating, modifying, and terminating sessions involving one or more participants. SIP uses proxy servers, registrars, and application and conference servers to provide registration functions to session participants, to locate and route requests to the participants, to authenticate and authorize services for the participants, and provide features to the participants.

SIP messages that are used to initiate sessions typically include session description information that allows participants in the session to agree on a set of compatible media types, such as vocoders, and to exchange information such as IP addresses and ports. Such information is typically formatted pursuant to a different protocol, such as a Session Description Protocol (SDP). SDP is designed to communicate relevant call setup information to the call participants and is intended for describing multimedia sessions for the purposes of session announcement, session invitation, and other forms of multimedia session initiation.

Multi-participant communication sessions, such as dispatch communication sessions, which are typically half-duplex communication sessions, and conference calls, require a strict mechanism to arbitrate who is allowed to speak at any particular time during the session. This speaker arbitration protocol is called "floor control." SIP does not provide such services as SIP is merely used to initiate a session that will be controlled by some other conference control protocol. SIP does not provide for the exchange of voice and other data once the session is established. While data packets commonly are exchanged among the participants in a VoIP session by utilization of RTP, there is no prescribed mechanism using RTP for provision of floor control. However, speaker arbitration may occur many times during the course of a dispatch or conference call, and therefore speaker arbitration must occur quickly and with a minimum of delay. Therefore a need exists for a method and apparatus that provides high-speed floor control for multi-participant IP-based communication sessions.

DETAILED DESCRIPTION OF THE INVENTION

To address the need for a method and an apparatus that provides high-speed floor control for multi-participant IP-based communication sessions, a communication system provides in-band speaker arbitration in a multi-participant communication session by use of RTP floor control messages that include a speaker arbitration command embedded in a data packet header extension.

Generally, an embodiment of the present invention encompasses a method for providing speaker arbitration in a communication session involving multiple participants. The method includes steps of assembling a Real Time Protocol (RTP) data packet, adding a header extension to the Real Time Protocol data packet, and embedding a speaker arbitration command in the header extension to produce an RTP floor control message.

Another embodiment of the present invention encompasses a method for speaker arbitration in a communication session involving a plurality of participants. The method includes steps of receiving a request to reserve a floor of the communication session, assembling a Real Time Protocol (RTP) floor control message comprising a request to reserve the floor, and transmitting the RTP floor control message.

Still another embodiment of the present invention encompasses a method for speaker arbitration in a communication session involving multiple participants and multiple nodes associated with the multiple participants. The method includes steps of receiving, from a participant of the multiple participants in the communication session, a first Real Time Protocol (RTP) floor control message comprising a request to reserve a floor of the communication session and determining whether the floor is available. The method further includes steps of, when the floor is available, transmitting a second RTP floor control message granting the request to reserve the floor, and when the floor is not available, transmitting a third RTP floor control message that fails to grant the request to reserve the floor.

Yet another embodiment of the present invention encompasses an apparatus for providing floor control for a communication session involving multiple participants and multiple nodes associated with the multiple participants. The apparatus includes a gateway having a signal processing unit that assembles a Real Time Protocol (RTP) data packet, adds a header extension to the RTP data packet, and embeds a speaker arbitration command in the header extension to produce an RTP floor control message.

Figure 1:
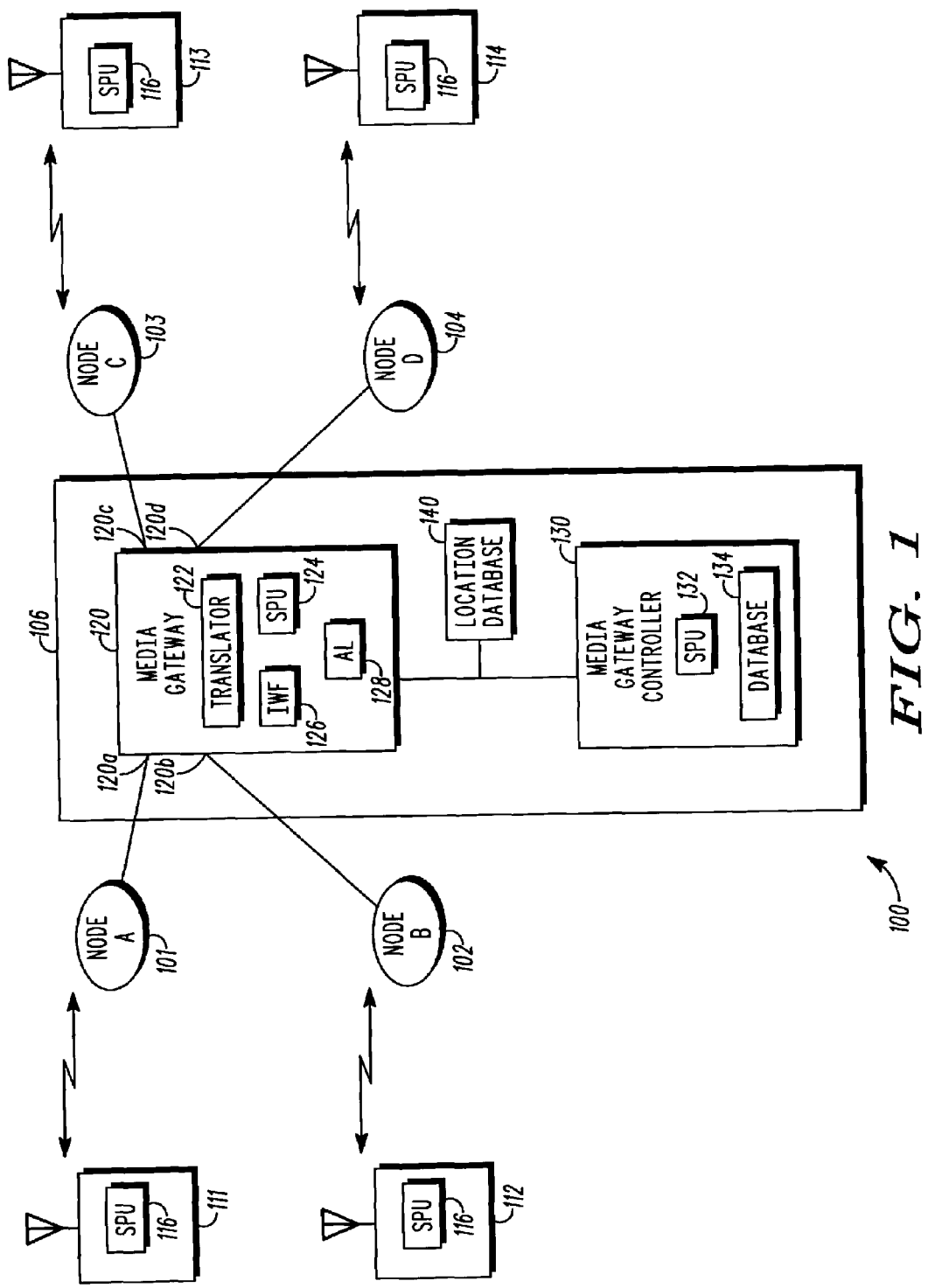
FIG. 1 is a block diagram of a wireless communication system in accordance with an embodiment of the present invention.

The present invention may be more fully described with reference to FIGS. 1-5. FIG. 1 is a block diagram of a wireless communication system 100 in accordance with an embodiment of the present invention. Communication system 100 includes multiple system nodes 101-104 (four shown) that are each in communication with an Internet Protocol (IP) network 106. In one embodiment of the invention, a wireless embodiment, each node is essentially a logical representation of the infrastructure equipment responsible for wireless transmission and reception within one or more coverage areas. In the wireless embodiment, each node comprises a base station controller (BSC) coupled to one or more base transceiver systems (BTSs). Each node 101-104 is coupled to IP network 106 via a radio network subsystem (not shown) that comprises a radio network controller. Each of nodes 101-104 provides communication services to a respective wireless user communication device 111-114, such as a mobile station (MS) such as a cellular telephone, radiotelephone, or wireless modem, located in a coverage area serviced by the node. In turn, each communication device 111-114 communicates with IP network 106 via the device's corresponding node 101-104.

In other embodiments of the present invention, one or more of nodes 101-104 may be a proxy server that provides communications services to a corresponding user communication device 111-114, such as a voice over IP (VoIP) telephone or a data communication device (DCD) such as a digital modem. The DCD preferably is coupled to digital terminal equipment (DTE), such as a personal computer, workstation, laptop computer, or other data terminal, and transfers data between the DTE and IP network 106.

Each communication device 111-114 includes a signal processing unit 116, such as one or more microprocessors, microcontrollers, digital signal processors (DSPs), combinations thereof or such other devices known to those having ordinary skill in the art, and one or more memory devices (not shown), such as random access memory (RAM), dynamic random access memory (DRAM), and/or read only memory (ROM) or equivalents thereof. The memory devices store programs executed by signal processing unit 116 and data utilized by the signal processing unit to permit the functioning of the corresponding communication device in communication system 100.

IP network 106 comprises a media gateway 120 operably coupled to a media gateway controller 130. Media gateway 120 provides a common IP communication link to each of multiple nodes, such as nodes 101-104, involved in a multi-participant communication session. In one embodiment of the present invention, media gateway 120 is an Intelligent Packet Duplicator (IPD) that is available from Motorola, Inc., of Schaumburg, Illinois, that has been modified to perform the functions of the present invention. In another embodiment of the present invention, media gateway 120 may comprise a conference bridge in communication with a packet data router that provides a common digital communication link to each of multiple nodes involved in the multi-participant communication session. Media gateway 120 then further includes a packet duplicator coupled to the conference bridge that provides packet duplication functionality.

When media gateway 120 receives a data packet from a node involved in a multi-participant communication session, such as node 101, the media gateway creates one or more duplicates of the received data packet for transmission to other participants, such as communication devices 112-114, in the multi-participant communication session. Media gateway 120 then routes the duplicate data packets to the nodes corresponding to the other participants, that is, nodes 102-104. In another embodiment of the present invention, an "IP multicast" embodiment, media gateway 120 may use the well know method of IP multicast to replicate RTP packets and to send the packets to each of communication devices 111-114. In the IP multicast embodiment, a common IP multicast address is assigned to each of nodes 101-104, or alternatively to each of communication devices 111-114. Audio packets that include the common IP multicast address can be sourced by the SPUs 116 of any of communication devices 111-114 to media gateway 120 in a unicast form. All required replication can then be economically performed by gateways, such as media gateway 120, comprised of IP routers.

In yet another embodiment of the present invention, when media gateway 120 is routing a data packet received from a first node, such as node 101, to another node, such as node 103, then the media gateway may merely route the received data packet instead of duplicating the packet, possibly changing a header with respect to the data packet destination, and not explicitly provide any speaker arbitration services. In still another embodiment of the present invention, the speaker arbitration services described herein as being performed by media gateway 120 may instead be performed by one of the participating communication devices 111-114 or nodes 101-104, again permitting the media gateway to merely route the received data packets and not explicitly provide any speaker arbitration services except for possibly changing a header with respect to the data packet destination.

Media gateway 120 includes a signal processing unit 124, such as one or more microprocessors, microcontrollers, digital signal processors (DSPs), combinations thereof or such other devices known to those having ordinary skill in the art, and one or more memory devices (not shown), such as random access memory (RAM), dynamic random access memory (DRAM), and/or read only memory (ROM) or equivalents thereof, that store data and programs that may be executed by signal processing unit 124. Among the data stored by the one or more memory devices are multiple gateway routing addresses, preferably IP addresses and port numbers, associated with the media gateway. The multiple gateway routing addresses provide routing destinations whereby communication devices 111-114 can send data packets to the media gateway. When a communication session is established, media gateway 120 communicates with each of multiple nodes involved in the session via a media gateway IP address/port combination assigned to the node by media gateway controller 130.

Media gateway controller 130 controls an allocation and bridging of multiple IP address/ports combinations of media gateway 120 to a communication session. In one embodiment of the present invention, media gateway controller 130 may be a dispatch communication controller, such as a Dispatch Application Processor (DAP) available from Motorola, Inc., that has been modified to perform the functions of the present invention. In another embodiment of the present invention, wherein media gateway 120 may comprise a conference bridge, media gateway controller 130 may be a conference bridge controller that has been modified to perform the functions of the present invention. Media gateway controller 130 includes a signal processing unit 132, such as one or more microprocessors, microcontrollers, digital signal processors (DSPs), combinations thereof or such other devices known to those having ordinary skill in the art, and one or more memory devices (not shown), such as random access memory (RAM), dynamic random access memory (DRAM), and/or read only memory (ROM) or equivalents thereof, that store data and programs that may be executed by the signal processing unit 132.

Communication system 100 comprises a packet data communication system. In order for a communication device, such as communication device 111, of system 100 to set up a communication session with one or more other communication devices of system 100, such as communication devices 112-114, the communication devices engage in an exchange of Session Initiation Protocol (SIP) messages via their corresponding nodes 101-104. The setup of a communication session via an exchange of SIP messages is well known in the art and is described in detail in RFC (Request for Comments) 2543, issued by the IETF (Internet Engineering Task Force) and hereby incorporated by reference herein in its entirety. Upon establishment of a communication session, voice data is exchanged via data packets formatted pursuant to a Real Time Protocol (RTP). RTP is a well known protocol and is described in RFC 1889, issued by the IETF and hereby incorporated by reference herein in its entirety.

Each SIP message comprises a header and a message body and includes a request that invokes a particular method, or function, on the node or communication device receiving the message. The header includes a routing address associated with the source of the message, for example, communication device 111, and routing addresses associated with the one or more intended destinations of the message, for example, communication devices 112-114. Each routing address typically is an SIP Uniform Resource Identifier (URI) that includes a host name and a domain that identifies the communication device. A routing address may also identify the target multi-participant talk group. For example, a method of routing messages to members of a multi-party talk group using a call initiation protocol such as SIP is described in U.S. patent application Ser. No. 09/990,929, entitled "Improved Use and Management of Groups Defined According to a Call Initiation Protocol," which patent application is assigned to the assignee of the present invention and is hereby incorporated herein in its entirety.

The message body of the SIP message includes a description of the session, such as the type of media, vocoder, sampling rate, and so on, that allows the participants in the session to agree on a set of compatible session details. However, the session description information is not described using SIP. Rather, the message body of each SIP message is encoded in a different protocol format, preferably a Session Description Protocol (SDP), as described in RFC 2327, issued by the IETF and hereby incorporated by reference herein in its entirety. SDP is designed to communicate relevant communication session set up information to the session participants and is intended for describing multimedia sessions for the purposes of session announcement, session invitation, and other forms of multimedia session initiation.

In communication system 100, a multi-participant communication session is initiated when an initiating communication device, such as communication device 111, sends an SIP_INVITE message to IP network 106. The SIP_INVITE message informs IP network 106 that communication device 111 desires to set up a multi-participant communication session involving at least two communication devices, such as a group call or a conference call. IP network 106 routes the SIP_INVITE message to media gateway controller 130, and the controller determines that communication device 111 desires to set up a multi-participant communication session and further determines the intended participants in the communication session.

In one embodiment of the present invention, an SDP of an SIP_INVITE message may include a group identifier that is associated with a talk group that includes communication device 111. A database 134 that resides in, or is coupled to, media gateway controller 130 stores the group identifier and further stores a list of communication devices that are members of the talk group. For example, database 134 may store a list of identifiers that are that are each uniquely associated with a communications device and are further associated with the group identifier. A location register 140 coupled to media gateway controller 130 stores a location in communication system 100 of each communication device 111-114, such as a node servicing the communication device. In another embodiment of the present invention, an SDP of an SIP_INVITE message may include a codeword associated with a prescheduled conference call. The codeword is further associated with a list of communication devices intended to participate in the conference call, which codeword and corresponding list are stored in media gateway controller 130. In yet another embodiment of the present invention, an SDP of an SIP_INVITE message may include a list of communication device identifiers associated with the communication devices that the initiating communication device desires to invite to participate in the session.

Upon receiving the SIP_INVITE message, media gateway controller 130 determines that the initiating communication device, that is, communication device 111, is requesting a set up of a multi-participant communication session. Media gateway controller 130 further determines the communication devices, that is, communication devices 112-114, invited to participate in the session. Media gateway controller 130 then assigns a media gateway, that is, media gateway 120, to the communication session and instructs media gateway 120 to allocate routing addresses associated with the media gateway, preferably IP addresses and port numbers, to each node corresponding to a participant in the communication session, that is, to each of nodes 101-104. In response to receiving the instruction, media gateway 120 allocates multiple media gateway IP addresses and multiple media gateway ports to the session and reports the allocated IP addresses and ports back to media gateway controller 130. Media gateway controller 130 then assigns one of multiple media gateway IP address/port combinations 120a-120d (four shown) to each node 101-104 participating in the session and informs media gateway 120 of the assigned address/port combinations. Media gateway controller 130 also informs media gateway 120 of a binding of each assigned media gateway address/port combination 120a-120d with an IP address and port of a corresponding node 101-104, thereby informing the media gateway of where to route subsequently received SIP and RTP data packets.

In another embodiment of the present invention, media gateway controller 130 may instruct media gateway 120 to allocate one IP address and port to the communication session. In response to receiving the instruction, media gateway 120 allocates a media gateway IP address and media gateway port to the session and reports the allocated IP address and port back to media gateway controller 130. Media gateway controller 130 then assigns the media gateway IP address/port combination to each of nodes 101-104 participating in the session and informs media gateway 120 of the assigned address/port combination and a binding of the assigned media gateway address/port combination with the IP addresses and ports corresponding to nodes 101-104, thereby informing the media gateway of where to route subsequently received SIP and RTP data packets. Media gateway 120 then monitors the assigned port and replicates all voice packets arriving at the port according to the talker arbitration mechanism described below. Each voice packet arriving at media gateway 120 is fully identified by source IP address and the SSRC/CSRC parameters included in the packet, which parameters are described below.

Media gateway controller 130 then conveys an SIP_INVITE message to each of the one or more session invitees, that is, communication devices 112-114, via media gateway 120 and the nodes 102-104 respectively associated with the communication devices. The SDP of each SIP_INVITE message includes information that informs the receiving node and/or communication device of the media gateway 120 address/port combination assigned by media gateway controller 130 to the receiving node, thereby informing the communication device and/or node where to route subsequent SIP and RTP data packets.

In response to receiving an SIP_INVITE message, each invitee, that is, each of communication devices 112-114, sends an SIP_OK message back to the initiating communication device, that is, communication device 111, via IP network 106. Initiating communication device 111 then acknowledges each SIP_OK message by sending an SIP_AC-KNOWLEDGMENT message back to the responding communication device and communication system 100 sets up an RTP media session in accordance with well known methods for an exchange of voice and data packets among the multiple participants. As noted above, the SIP messages exchanged by the participants in setting up the session provide for a negotiation of the type of RTP media session that the participants are willing to establish, including the services and features that will be provided to the participants.

IP network 106, preferably media gateway controller 130 or alternatively media gateway 120, investigates the SDP portion of each SIP message exchanged during the set up and negotiation of the communication session. When session negotiations reveal a message format incompatibility among the nodes, such as a first node of participating nodes 101-104 having a first vocoder different from a second vocoder utilized by a second node of participating nodes 101-104, or a first node of participating nodes 101-104 operating pursuant to a first standard or message format, such as pulse code modulation (PCM), that is different from a second standard or message format, such as Universal Mobile Telecommunications System (UMTS), utilized by a second node of participating nodes 101-104, media gateway controller 130 may drop an incompatible node, such as a node that uses a vocoder different from the vocoders used by the other nodes participating in the session.

In another embodiment of the present invention, IP network 106 may include one or more translators 122 (one shown) that are capable of translating messages from one format to another, such as from one protocol or standard to another protocol or standard. Each of the one or more translators 122 may be included in media gateway 120 or may be included in an applications platform that is operably coupled to media gateway 120. When media gateway controller 130 determines a format incompatibility among the nodes invited to participate in a session, such as a vocoder or standard incompatibility, media gateway controller 130 assigns an appropriate translator 122 to translate communications with the incompatible node. The assigned translator 122 then translates RTP data packets exchanged between media gateway 120 and the incompatible node during the communication session.

Figure 2:
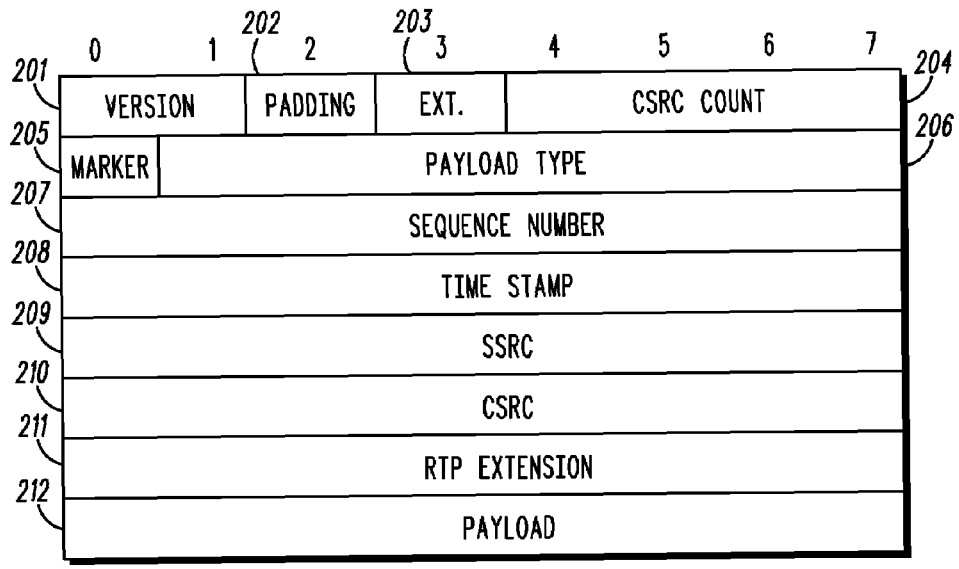
FIG. 2 is bit map of an exemplary Real Time Protocol data packet of the prior art.

Upon establishment of the RTP media session, voice data is exchanged among the multiple communication devices involved in the communication session, that is, communication devices 111-114, by use of data packets formatted pursuant to RTP and assembled by the respective signal processing unit 116 of the communication device 111-114. FIG. 2 is bit map of an exemplary RTP data packet of the prior art. RTP data packet 200 includes an RTP fixed header that includes multiple data fields 201-210 and a payload data field 212. RTP data packet 200 may optionally further include an undefined RTP header extension data field 211. The fixed header includes a "version" data field 201 that identifies the RTP version used and "padding" data field 202 that, when set to a value of '1,' indicates that data packet 200 includes one or more additional padding octets at the end of the packet, which octets are not part of the payload. The fixed header further includes an "extension" data field 203 that, when set to a value of '1,' indicates that the fixed header is followed by a header extension, and a "Contributing Source Count" (CSRC) data field 204 that includes the number of CSRC identifiers that follow the fixed header.

A "marker" data field 205 of the fixed header provides for a marking of significant events in a data packet stream, such as boundaries of a data frame, and is identified by a profile. A "payload type" data field 206 of the fixed header includes a code that identifies the format of the RTP payload. The profile specifies a default static mapping of payload type codes to payload formats, with the result that the payload type code determines an interpretation of the payload by an application in a receiving communication device. A "sequence" data field 207 of the fixed header provides sequential numbering for each data packet in a series of related data packets. The receiving communication device may use the sequence numbers to detect data packet loss and to restore data packet sequence when packets are received out of sequence. A "time stamp" data field 208 of the fixed header identifies a sampling instant of the first octet in the RTP data packet. The receiving communication device may use the time stamp for synchronization and to measure data packet arrival jitter. A "Synchronization Source Count" (SSRC) data field 209 of the fixed header uniquely identifies the originator of the RTP packet. A "CSRC" data field 210 of the fixed header includes a list of identifiers associated with the contributing sources for the payload included in the data packet.

Figure 3:
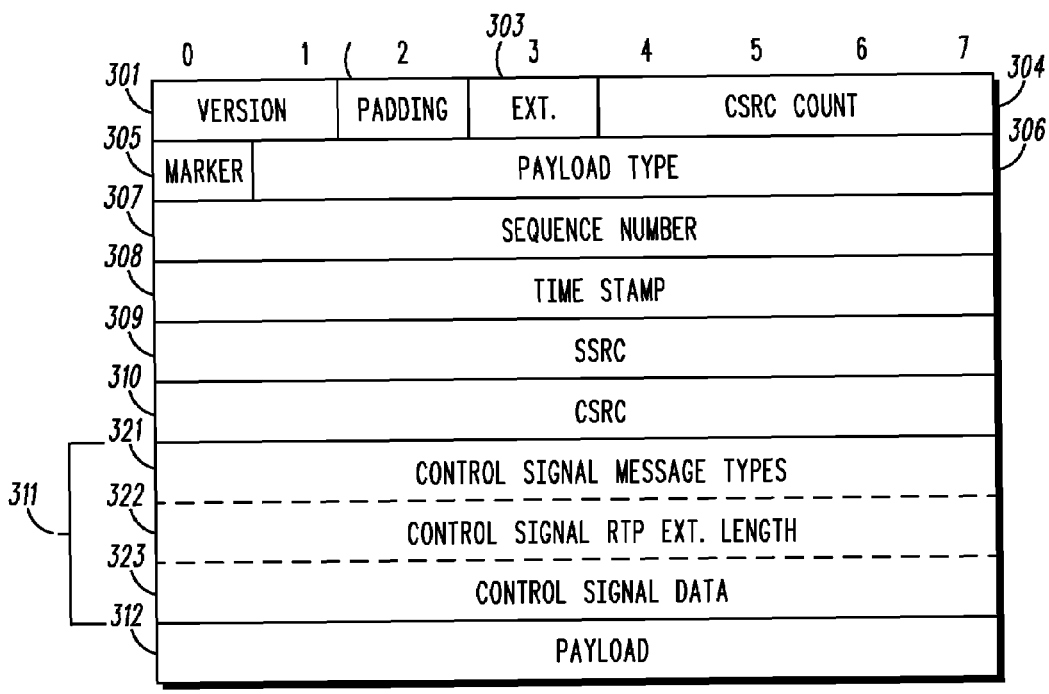
FIG. 3 is a bit map of a Real Time Protocol data packet in accordance with an embodiment of the present invention.

In order to provide speaker arbitration, or "floor control," for a multi-participant communication session that is both high speed and that may be implemented within the framework of an RTP session, communication system 100 provides 'in-band' floor control by use of RTP floor control messages. Each RTP floor control message comprises an RTP data packet that includes an RTP floor control header extension. FIG. 3 is a bit map of an RTP floor control message 300 in accordance with an embodiment of the present invention. Preferably, each RTP floor control message 300 is assembled by a signal processing unit of the component of system 100 transmitting the message, such as the respective signal processing units 116 of communication devices 111-114 or signal processing unit 124 of media gateway 120. Similar to RTP data packet 200, RTP floor control message 300 comprises a payload data field 312 and a fixed header 301-310 that includes a version data field 301, a padding data field 302, an extension data field 303, a CSRC count data field 304, a marker data field 305, a payload type data field 306, a sequence data field 307, a time stamp data field 308, an SSRC data field 309, and a CSRC data field 310.

Unlike RTP data packet 200, RTP floor control message 300 further includes an RTP floor control header extension data field 311 that includes multiple floor control sub-fields 321-323. A first sub-field 321 of RTP floor control header extension 311 comprises a floor control message type data field that identifies an RTP data packet as a RTP floor control message and that further identifies the type of RTP floor control message. A second sub-field 322 of RTP floor control header extension 311 identifies a length of the RTP floor control header extension. A third sub-field 323 of RTP floor control header extension 311 is embedded with floor control data, preferably a speaker arbitration command, corresponding to the RTP floor control message identified by sub-field 321. In order to alert a receiving communication device to the presence of RTP floor control header extension 311, extension data field 303 of RTP floor control message 300 is embedded with a value of '1.'

By implementing an in-band floor control protocol between the communication devices, communication system 100 provides a floor control protocol that is transparent to the underlying network and devices. A practical deployment of a floor control protocol for a multi-party communication session would normally require the inclusion of firewalls placed at various locations within and between infrastructure and remote entities. For SIP and RTP to penetrate firewalls, it is known in the art to enable firewalls to monitor the SDP settings for conferences and allow or disallow packets to pass through the firewall based on rules setup by the firewall administrator. An 'out-of-band' floor control protocol would suffer by requiring additional firewall services to allow the control protocol to pass transparently. Embedding the floor control protocol within the bearer payload structure of an RTP data packet ensures timely delivery of the control information and free access through any intervening security measures.

Preferably, the multiple RTP floor control messages implemented by communication system 100 in order to provide a process for speaker arbitration include the following six floor control messages. A first message of the multiple RTP floor control messages is a Request Transmission message that requests to reserve the floor, that is, that requests to be a user information transmitting device, such as a speaker, in a multi-participant communication session. The RTP packets that contain the Request Transmission message may further include voice samples. The audio contained in the voice packets is ignored if the source of the voice packet does not have permission to speak at the given time since only one participant may reserve the floor at any particular time. A second message of the multiple RTP floor control messages is a Grant Transmission message that grants the floor to the requester in response to a Request Transmission message. A third message of the multiple RTP floor control messages is a Begin Transmission message that identifies the start of a data transmission by the grantee after being granted the floor. A fourth message of the multiple RTP floor control messages is an End Transmission message that relinquishes control of the floor by the grantee and that indicates that the floor is open for reservation by the other participants in the communication session. A fifth message of the multiple RTP floor control messages is an Acknowledgment message that may be used as a general reply to a Request Transmission message when there is no other reply. A sixth message of the multiple RTP floor control messages is a Request Deny message that denies a requestor's request to reserve the floor.

By providing RTP floor control messages that may be exchanged among the participants and intervening IP network involved a multi-participant IP communication session, communication system 100 provides in-band speaker arbitration that is highspeed and that operates with minimal modifications to currently existing IP networks. Preferably, each of the Grant Transmission message, the Acknowledgement message, and the Request Deny message includes information that uniquely identifies the requestor and the Begin Transmission message includes information that uniquely identifies the grantee.

Figure 4:
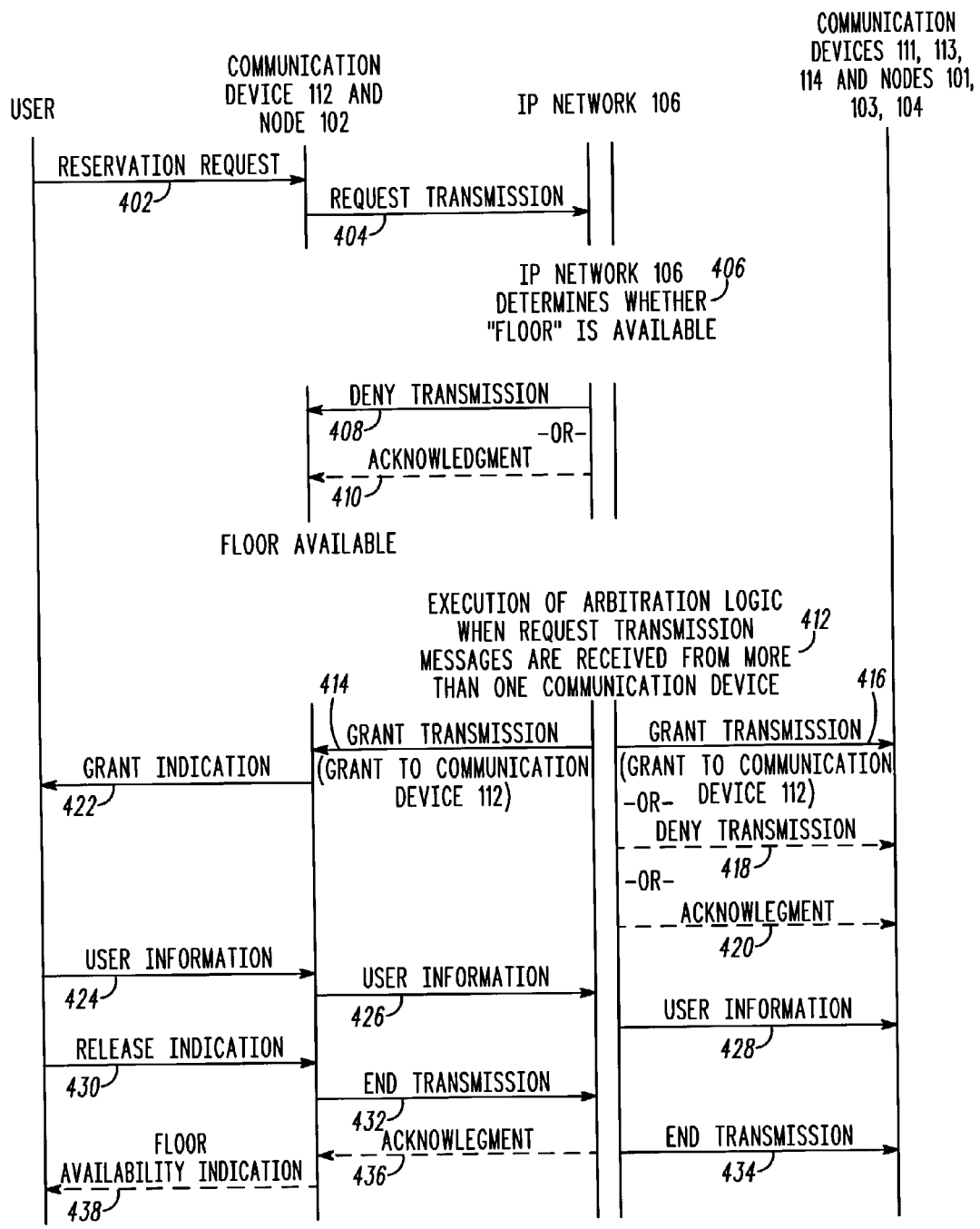
FIG. 4 is a logic flow diagram of steps executed by the communication system of FIG. 1 in providing floor control in a multi-participant communication session in accordance with an embodiment of the present invention.

Referring now to FIG. 4, a message flow diagram 400 is provided that illustrates a communication system 100 speaker arbitration process for a multi-participant communication session in accordance with an embodiment of the present invention. Message flow diagram 400 begins when a participant in a multi-participant communication session, such as a user of communication device 112, who desires to reserve the floor in order to transmit user information, that is, to speak or to transmit user data, inputs a floor reservation request (402) into the participant's communication device, that is, communication device 112. For example, the participant may depress a key on a keypad, such as a Push-To-Talk (PTT) key on a radiotelephone keypad, that indicates the user's desire to reserve the floor. In response to receiving the request, the communication device 112, assembles an RTP floor control Request Transmission message (404) and conveys the message to IP network 106, and in particular media gateway 120, via a corresponding node 102.

In response to receipt of the Request Transmission message, IP network 106, and in particular media gateway 120, determines (406) whether the floor is available. In other embodiments of the present invention, one or more of the functions performed by media gateway 120 with respect to message flow diagram 400 may be performed by media gateway controller 130, depending upon the level of intelligence implemented in media gateway 120 by the designer of system 100. When media gateway 120 determines that the floor is not available, for example, is under the reservation of another communication device participating in the communication session, such as communication device 111, media gateway 120 conveys an RTP floor control message to the requester, that is, to communication device 112, that fails to grant the request to reserve the floor. In one embodiment of the present invention, the message that fails to grant the request to reserve the floor may be a Deny Transmission message (408). For example, communication device 111 may be actively transmitting data to media gateway 120 for distribution to the other participants in the communication session. By way of another example, communication device 111 may have attempted to release the floor by conveyance of an End Transmission message to media gateway 120 but the media gateway has not yet released the floor from reservation by communication device 111. If the Deny Transmission message contains information that identifies the requestor, media gateway 120 may use IP multicast to transmit one or more Deny Transmission messages. The message will be replicated to both the requestor, that is, communication device 112, and to one or more of the other participants, that is, to one or more of communication devices 111, 113, and 114. The other participants can than use the information that identifies the requestor to determine that the message is not intended for them, and choose to ignore the message.

In another embodiment of the present invention, the message conveyed by media gateway 120 to the requestor that fails to grant the request to reserve the floor may be an RTP floor control Acknowledgment message (410). In yet another embodiment of the present invention, wherein multiple participants request the floor and media gateway 120 determines to grant the floor to a different participant as described below, the message conveyed by the media gateway to the requestor that fails to grant the request to reserve the floor may be an RTP floor control Grant Transmission message (416) that grants the floor to another. By reception by a requestor, that is, by a requestor's communication device, of a message other than an RTP floor control Grant Transmission message granting the floor to the requester in response to a conveyance of an RTP floor control Request Transmission message, the requestor's communication device is informed that the requestor's request to reserve the floor has been denied.

When media gateway 120 determines that the floor is open, that is, is available for reservation, the media gateway conveys an RTP floor control Grant Transmission message (414) to the requestor, that is, to communication device 112, and the node associated with the requestor's communication device, that is, node 102. The floor may be open because it is no longer being reserved, or the floor may be open because media gateway 120 determines to open a floor reserved by one communication device for reservation by another communication device. For example, communication system 100 may implement a process of speaker preemption, wherein a speaker may be eligible for pre-emption, that is, may be eligible to lose his or her reservation of the floor, after the speaker has reserved the floor for a continuous, predetermined length of time. By way of another example, communication system 100 may implement a process of an emergency override, wherein a first communication device may lose reservation of the floor in favor of a second communication device when the second communication device requires the floor to transmit an emergency communication.

The Grant Transmission message informs the requestor that he or she is being granted a reservation of the floor and may begin speaking or transmitting user data. In another embodiment of the present invention, in addition to conveying the Grant Transmission message to the grantee, media gateway 120 additionally may convey an RTP floor control Grant Transmission message (416) that identifies the grantee, that is, communication device 112, and/or the node associated with the grantee, that is, node 102, to one or more of the other participants in the communication session, that is, to one or more of communication devices 111, 113, and 114, via the node associated with the participant. Since the Grant Transmission message contains information that identifies the grantee, the media gateway 120 can use IP multicast to replicate a single Grant Transmission message to both grantee, that is, communication device 112, and to one or more of the other participants, that is, to one or more of communication devices 111, 113, and 114.

In yet another embodiment of the present invention, media gateway 120 may receive a Request Transmission message from each of multiple participants' communication devices, such as communication devices 112, 113, and 114. The multiple Request Transmission messages may be simultaneously received by media gateway 120 or may be received within a predetermined or dynamically determined time period of each other, thereby allowing geographically remote communication devices to compete for the floor on an equal basis with closer communication devices. When media gateway 120 determines that the floor is not available, the media gateway conveys an RTP floor control Deny Transmission message (408) to each requester, that is, to each of communication devices 112, 113, and 114. When media gateway 120 determines that the floor is available, then the media gateway, and in particular an arbitration logic unit 128 in the media gateway, executes an arbitration algorithm (412) stored in the one or more memory devices of the media gateway to select a reservation request to grant from among the multiple reservation requests. In another embodiment of the present invention, arbitration logic unit 128 may instead reside in media gateway controller 130 and execute an arbitration algorithm stored in a memory device of the media gateway controller.

Those who are of ordinary skill in the art realize that any one of many well known arbitration algorithms may be used here without departing from the spirit and scope of the present invention. For example, communication system 100 may assign a priority to each communication device 111-114, such as a hierarchical ranking. Upon receiving a Request Transmission message from each of multiple communication devices 112-114, media gateway 120 determines a priority of each of the multiple communication devices based on an identifier included in the SSRC data field 209 of the RTP floor control Request Transmission message conveyed the by the device. Based on the determined priorities, arbitration logic unit 128 executes an arbitration algorithm to determine the communication device having the highest priority and preferably grants the floor to that communication device.

By way of another example, a determination of which reservation request to grant may be based on a round robin algorithm, wherein media gateway 120 or media gateway controller 130 maintains a record of the number of times that each participant in a communication session has been granted the floor. Based on the number of times that each participant has been granted the floor, arbitration logic unit 128 executes an arbitration algorithm stored in the memory device of media gateway 120 to determine the participant who has had the fewest number of grants and preferably grants that participant the floor. Other examples of arbitration algorithms include prioritization based on a time of arrival of each request of multiple requests and prioritization based on a location of each participant of multiple participants.

Upon determining that the floor is available and further determining, when multiple Request Transmission messages are received, a requester to whom to grant a reservation of the floor, media gateway 120 transmits an RTP floor control Grant Transmission message (414) to the grantee. In one embodiment of the present invention, when multiple Request Transmission messages are received, media gateway controller 130 further transmits (416) an RTP floor control Grant Transmission message to each of the other participants who requested to reserve the floor, the Grant Transmission message identifying the grantee that is granted the floor. In another embodiment of the present invention, upon determining that the floor is available and further determining, when multiple Request Transmission messages are received, a requestor to whom to grant a reservation of the floor, media gateway controller 130 and media gateway 120 may replicate and transmit to each of multiple participants in the communication session, by use of IP multicast, an RTP floor control message granting the request to reserve the floor. Each of the multiple participants who requested to reserve the floor is then able to determine whether they have been granted or denied the floor based on the grantee identified by the message. In yet another embodiment of the present invention, when multiple Request Transmission messages are received, media gateway controller 130 may transmit an RTP floor control Deny Transmission message (418) to each of the other participants who requested to reserve the floor and is being denied the floor. In still another embodiment of the present invention, media gateway controller 130 may transmit an RTP floor control Acknowledgement message (420) to each of the other participants who requested to reserve the floor and is being denied the floor. Each of the multiple participants who requested to reserve the floor is then able to determine that they have been denied the floor based on their reception of a message other than an RTP floor control Grant Transmission message listing them as the grantee.

The grantee communication device 112, in response to receiving the Grant Transmission message, provides (422) an indication to a user of the grantee communication device that the user has been granted the floor. For example, the grantee communication device may provide an audio indication to the user, such as a beep, or the communication device may provide a visual indication to the user, such as activating an inactivated light emitting diode (LED), or inactivating an activated LED. Upon being informed that he or she has been granted a reservation of the floor, the user is then able to transmit voice data or other user information to the other participants in the communication session. The user inputs user information (424) comprising voice or other user data into the user's communication device, that is, communication device 112. In response to receiving the user information, communication device 112 assembles one or more RTP data packets 200 that includes the user information and conveys the one or more RTP data packets (426) to media gateway 120 via the requestor's node 102 and the media gateway address/port combination 120b associated with the requestor's node. Each of the one or more user data RTP data packets includes user information that is embedded in payload data field 212 and a value of "0" that is embedded in Extension data field 203.

When media gateway 120 receives each RTP data packet that includes user information from grantee communication device 112, the media gateway generates copies of the user information included in the received data packet. Media gateway 120 then assembles an RTP packet that includes the user information for each node 101, 103, 104 bound to a media gateway address/port combination 120a, 120c, 120d assigned to the communication session, and conveys an assembled RTP data packet (428) comprising a copy of the user information to each of the other participants in the communication session via their corresponding nodes. For example, when media gateway 120 receives an RTP data packet comprising user information from communication device 112, the media gateway makes a copy of the user information included in the received RTP packet for each node 101, 103, 104 associated with at least one of the other communication devices participating in the session, that is, communication devices 111, 113, and 114, and bound with a media gateway address/port combination 120a, 120c, 120d assigned for the session. Media gateway 120 assembles an RTP data packet for each such node that includes a copy of the user information. Media gateway 120 then routes an assembled RTP data packet to each communication device 111, 113, 114 via a respective node 101, 103, 104 and a respective media gateway address/port combination 120a, 120c, and 120d associated with the node.

When the user of the grantee communication device finishes transmitting user information, the grantee initiates a release of the floor by indicating his or her desire to release the floor (430) to the grantee communication device, that is, communication device 112. For example, the user may simply stop speaking into the device, or the user may release a PTT key that the user keeps depressed for so long as the user wishes to reserve the floor and transmit user information. In response to receiving the user's indication of his or her desire to release the floor, the grantee communication device determines to release the floor and assembles an RTP floor control End Transmission message. The RTP floor control End Transmission message informs a recipient of the message of a sender's intention to release a reservation of the floor. The grantee communication device then transmits the RTP floor control End Transmission message (432) to IP network 106, and in particular to media gateway 120.

Media gateway 120 receives the RTP floor control End Transmission message and, in response to receiving the message, generates an RTP floor control End Transmission message for each of the other participants in the communication session. Alternatively, media gateway 120 may create duplicates of the received End Transmission message for transmission to each of the other participants. Media gateway controller 130 then routes (434) the RTP floor control End Transmission messages to each of the other participants in the communication session. In another embodiment of the present invention, in response to receiving the End Transmission message, media gateway 120 may also generate an RTP floor control Acknowledgment message that acknowledges receipt of the End Transmission message and convey the RTP floor control Acknowledgment message (436) to the grantee communication device, that is, communication device 112. In response to receiving an RTP floor control End Transmission message, each participant's communication device, that is, communication devices 111, 113, and 114, indicates to a user of the device that the channel is available for reservation (438). Those who are of ordinary skill in the art realize that there are many methods of indicating floor availability that may be used herein without departing from the spirit and scope of the present invention, such as an audio indication, such as a beep, or a visual indication, such as an LED that is either activated or inactivated upon receipt of the End Transmission message.

In another embodiment of the present invention, one or more of nodes 101-104 may not be able to support the exchange of RTP floor control messages described above with respect to FIGS. 1-4. In such an embodiment, media gateway 120 may further include at least one interworking function unit (IWF) 126 (one shown) that may be used to interconnect nodes supporting different versions of RTP. In this embodiment, the SDP portions of the SIP messages exchanged by the participants in setting up a communication session inform of a version of RTP supported by each of nodes 101-104. When media controller 130 determines that one or more of nodes 101-104 supports a version of RTP that is different than a version supported by one or more other nodes of nodes 101-104, media controller 130 instructs media gateway 120 to assign IWF 126 to reformat communications between the two nodes or to generate messages that are supported by one version of RTP and are not supported by the other version of RTP, thereby allowing the nodes supporting various versions of RTP to engage in a communication session with each other.

For example, each of nodes 101-103 may support a version of RTP that includes speaker arbitration using an RTP header extension, as described above, while node 104 may be a legacy node that supports a version of RTP that does not include header extensions. Media gateway controller 130 may then assign IWF 126 to process packets received from nodes 101-103 and intended for node 104 so that the packets are in a format supported by node 104. When IWF 126 receives an RTP data packet that includes a header extension from one of nodes 101-103 and intended for node 104, IWF 126 ignores the header extension and processes the rest of the RTP data packet for node 104.

IWF 126 may also generate RTP floor control messages on behalf of legacy node 104 so that node 104 may nevertheless engage in speaker arbitration with nodes 101-103. For example, IWF 126 preferably can distinguish between voice and silence. When the floor is available and IWF 126 receives a non-silence RTP data packet from node 104, the IWF may generate an RTP floor control Request Transmission message on behalf of node 104. When node 104 is denied the floor in response to transmission of the Request Transmission message, IWF 126 subsequently blocks RTP messages received from node 104. When node 104 is granted the floor in response to transmission of the Request Transmission message, IWF 126 subsequently forwards RTP messages received from node 104. And when node 104 is granted the floor and then remains silent for a predetermined period of time, IWF 126 may generate an RTP floor control End Transmission message relinquishing control of the floor on behalf of node 104.

In still another embodiment of the present invention, IWF 126 may support multiple packet data protocols, such as iDEN (Integrated Digital Enhanced Network) and a version of RTP that includes speaker arbitration using RTP header extensions, and may translate data packets between nodes that support one protocol and nodes that support another protocol.

In general, communication system 100 provides in-band speaker arbitration in a multi-participant communication session by use of multiple RTP floor control messages 300 that include a speaker arbitration command embedded in an RTP data packet header extension. The RTP floor control messages 300 include a Request Transmission message that requests to reserve the floor, a Grant Transmission message that grants the floor to the requestor in response to a Request Transmission message, a Begin Transmission message that identifies the start of a data transmission by the grantee after being granted the floor, an End Transmission message that relinquishes control of the floor by the grantee and that indicates that the floor is open for reservation by the other participants in the communication session, an Acknowledgment message that may be used as a general reply to a Request Transmission message when there is no other reply, and a Request Deny message that denies a requestor's request to reserve the floor. When an RTP floor control message is received by media gateway 120, the gateway may convey a responsive RTP floor control message back to the conveyor of the message and/or other participants in the communication session or may replicate the message for conveyance to the other participants. Communication system 100 may also utilize IP multicast for replication and transmission of a received floor control message or a responsive floor control message. By implementing an in-band floor control protocol between the communication devices, communication system 100 provides a floor control protocol that is transparent to the underlying network and devices, thereby ensuring timely delivery of the control information and free access through any intervening security measures.

Figure 5:
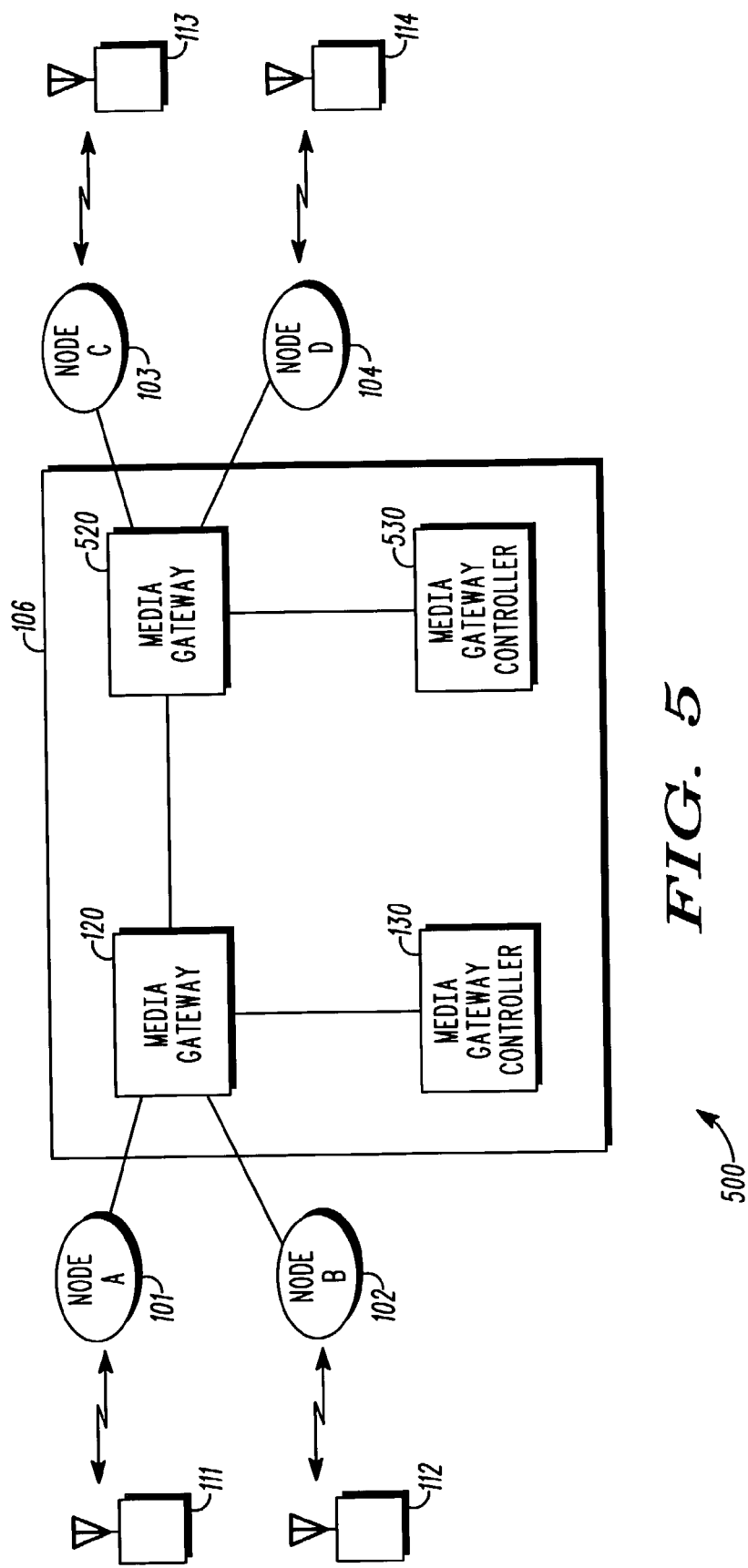
FIG. 5 is a block diagram of a wireless communication system in accordance with another embodiment of the present invention.

FIG. 5 is a block diagram of a communication system 500 in accordance with yet another embodiment of the present invention. Similar to communication system 100, in communication system 500 each of communication devices 111 and 112 communicates with a first media gateway 120 and a first media gateway controller 130 of IP network 106 via nodes 101 and 102, respectively. However, unlike communication system 100, in communication system 500, each of communication devices 113 and 114 involved in a communication session communicate with first media gateway 120 and media gateway controller 130 via respective nodes 103 and 104 and a second media gateway 520 included in IP network 106. In one embodiment of communication system 500, first media gateway 120 and second media gateway 520 are each controlled by a same media gateway controller 130. In another embodiment of the present invention, first media gateway 120 is controlled by first media gateway controller 130 and second media gateway 520 is controlled by a second media gateway controller 530.

In one embodiment of communication system 500, each of nodes 103 and 104 is operably coupled to second media gateway 520 as part of the design of system 500. In another embodiment of communication system 500, media gateway controller 130 may dynamically assign second media gateway 520 to service nodes 103 and 104 during a set up of a communication session involving communication devices 111-114. In yet another embodiment of communication system 500, during a set up of a communication session involving communication devices 111-114, media gateway controller 130 may determine that another media controller 530 should provide service to nodes 103 and 104. Media gateway controller 130 then instructs second media gateway controller 530 to service the nodes during the session and assigns second media gateway 530 to the nodes. Preferably, when multiple gateways 120, 520 are utilized in a communication session, one gateway (e.g., media gateway 120) of the multiple gateways is designated a master and the other gateways (e.g., media gateway 520) of the multiple gateways are each designated a slave. The floor control determinations and arbitration algorithms are then performed by the master gateway (i.e., gateway 120) and associated gateway controller (i.e., gateway controller 130).

For example, media gateway controller 130 may determine, during an exchange of SIP messages used to set up the communication session, that multiple nodes, that is, nodes 103 104, invited to participate in the communication session suffer from a same incompatibility, for example, use a same incompatible message format or have a same incompatible vocoder. Media gateway controller 130 may then assign second media gateway 520 to service each of the similarly incompatible nodes 103 and 104. The assigned second media gateway 520 may either include a translator that translates between the incompatible data formats of the vocoders of nodes 101-102 and the vocoders of nodes 103-104, or may utilize an appropriate translator that is included in an applications platform operably coupled to media gateway 520.

By way of another example, media gateway controller 130 may determine that a subset of the participants in the communication session, such as communication devices 113 and 114 and their associated nodes 103, 104, are geographically proximate to second media gateway 520 and geographically distant from first media gateway 120. Proximity of nodes may be determined by comparing the IP addresses of each of the nodes to determine that two or more of the nodes are in the same IP network or sub-network. A second media gateway 520 may then be chosen such that the gateway is in the same network or a related network (as determined by a look-up table). Proximity of nodes may also be determined based on 'contact' information that is inside SIP messages and exchanged by communication devices 111-114 and nodes 101-104 during the establishment of the communication session. The 'contact' information includes a URL (Uniform Resource Locator) or IP address identifying a location of the participant at that time. URLs may then be investigated for common text strings and/or the IP addresses may be investigated for common networks or sub-networks. A second media gateway 520 may then be selected with a similar URL or IP address. Media gateway controller 130 may then assign second media gateway 520 to service the distant subset of participants, thereby reducing the number of packets that must traverse a portion of IP network 106. For example, U.S. patent application Ser. No. 10/137,137, entitled "Method and Apparatus for Placing a Dispatch Call" describes a method for distributing data packets to a distant subset of participants, which application is assigned to the assignee of the present invention and is hereby incorporated herein in its entirety.

In communication system 500, when a communication session including communication devices 111-114 is set up, media gateway controller 130 assigns a media gateway 120 IP address/port combination to each of node 101, node 102, and media gateway 520, and informs media gateway 120 of the assigned address/port combinations. Media gateway controller 130 also informs media gateway 120 of a binding of each assigned media gateway 120 address/port combination with an IP address and port of a corresponding node or media gateway. The media gateway controller associated with media gateway 520, that is, first media gateway controller 130 or second media gateway controller 530, also assigns a media gateway 520 IP address/port combination to each of nodes 103, node 104, and media gateway 120, and informs media gateway 520 of the assigned address/port combinations. The media gateway controller associated with media gateway 520 also informs media gateway 520 of a binding of each assigned media gateway 520 address/port combination with an IP address and port of a corresponding node or media gateway.

When an RTP data packet is routed by first media gateway 120 to each of communication devices 113 and 114 via nodes 103 and 104, a single version of the packet may be routed by first media gateway 120 to second media gateway 520. Media gateway 520 makes duplicates of the received RTP packet for transmission to each participating node bound to an address/port combination of media gateway 520, that is, nodes 103 and 104, and routes the duplicate RTP data packets to each communication device 113, 114 via the device's respective node 103, 104.

By assigning a second media gateway 520 to service multiple nodes that suffer from a same incompatibility, communication system 500 efficiently facilitates a participation of incompatible nodes in an exchange of RTP floor control messages as part of a multi-participant communication session. In addition, by assigning a second media gateway 520 to service multiple nodes proximate to the second media gateway, communication system 500 reduces a number of packets that must traverse a portion of IP network 106, thereby providing for a more efficient distribution of RTP floor control messages across network 106. A result is an efficient, high speed floor control process that floor control protocol that is transparent to the underlying network and devices that imposes minimal overhead on the implementing communication system.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for providing floor control for a communication session involving a plurality of participants and a plurality of nodes associated with the plurality of participants, the apparatus comprising:
    a first gateway that is configured to assemble a first Real Time Protocol (RTP) Internet Protocol (IP) packet, embed a real time speaker arbitration command to reserve a floor in the first RTP IP packet to produce a real time floor control message, and allocate a first plurality of gateway routing addresses to the communication session;
    means for receiving a second RTP IP packet;
    means for creating one or more duplicates of the received second RTP IP packet;
    means for transmitting the one or more duplicates of the received second RTP IP packet; and
    a controller coupled to the first gateway that assigns a gateway routing address of the plurality of gateway routing addresses to each node of the plurality of associated nodes, determines that a first node of the plurality of nodes utilizes a first message format that is different than a second message format utilized by each of a second node of the plurality of nodes and a third node of the plurality of nodes, and in response to determining that the second node and third node each utilize a second message format, assigns a second gateway to receive messages from the first gateway, generate duplicates of the received messages, and route the duplicates of the received messages to each of the second node and the third node.

2. The apparatus of claim 1, further comprising arbitration logic that executes an arbitration algorithm, wherein the arbitration algorithm selects a participant to be granted the floor of the communication session from among a plurality of participants requesting the floor.

3. The apparatus of claim 1, wherein the gateway further utilizes Session Initiation Protocol (SIP) to set up the communication session.

4. The apparatus of claim 1, wherein the gateway further conveys to each node of the plurality of associated nodes a Session Initiation Protocol message that comprises the routing address assigned by the controller to the node.

5. The apparatus for claim 1, wherein the controller assigns a first gateway routing address of the plurality of first gateway routing addresses to the second gateway.

6. The apparatus of claim 1, wherein the second gateway allocates a plurality of second gateway routing addresses to the communication session and wherein the controller assigns a second and a third gateway routing addresses of the plurality of second gateway routing addresses to each of the second node and the third node.

7. The apparatus of claim 1, further comprising:
    a translator capable of translating a message from the first message format to the second message format; and
    a means for assigning the translator to translate messages exchanged between the first node and the second node.

8. The apparatus of claim 1, further comprising:
    an interworking function unit capable of translating a message from the first message format to the second message format; and
    a means for assigning the interworking function unit to translate messages exchanged between the first node and the second node.

9. The apparatus of claim 1, wherein the first gateway further adds a header extension to the first Real Time Protocol Internet Protocol packet and embeds the real time speaker arbitration command in the header extension.

10. The apparatus of claim 1, where the first Real Time Protocol Internet Protocol packet is a Real Time Protocol data packet.

11. An apparatus for providing floor control for a communication session involving a plurality of participants and a plurality of nodes associated with the plurality of participants, the apparatus comprising:

a first gateway that is configured to assemble a first Real Time Protocol (RTP) Internet Protocol (IP) packet, embed a real time speaker arbitration command to reserve a floor in the first RTP IP packet to produce a real time floor control message, and allocate a plurality of gateway routing addresses to the communication session;

means for receiving a second RTP IP packet;

means for creating one or more duplicates of the received second RTP IP packet;

means for transmitting the one or more duplicates of the received second RTP IP packet; and a controller coupled to the first gateway that assigns a gateway routing address of the plurality of gateway routing addresses to each node of the plurality of associated nodes, determines that a first node of the plurality of nodes and a second node of the plurality of nodes are proximate to a second gateway, and in response to determining that the first node the second node are proximate to the second gateway, assigns the second gateway to receive messages from the first gateway, generate duplicates of the received messages, and route the duplicates of the received messages to each of the first node and the second node.

12. The apparatus for claim 11, wherein the controller assigns a first gateway routing address of the plurality of first gateway routing addresses to the second gateway.

13. The apparatus of claim 11, wherein the first gateway further adds a header extension to the first Real Time Protocol Internet Protocol packet and embeds the real time speaker arbitration command in the header extension.

14. A mobile user communication device capable of engaging in speaker arbitration during a dispatch communication session involving multiple participants, the user communication device comprising a signal processing unit that is configured to assemble a first Real Time Protocol (RTP) Internet Protocol (IP) packet, embed a real time speaker arbitration command to request a floor of the communication session in the first RTP IP packet to produce a first real time floor control message, convey the first real time floor control message to a gateway, receive a second RTP IP packet from the gateway that contains an arbitration command comprising an identity of a user communication device that grants a reservation of the floor to the mobile user communication device, assemble a third RTP IP packet and embed a second speaker arbitration command in the third RTP IP packet to produce a second real time floor control message that identifies a beginning of a transmission by the user communication device when acting as a grantee of a floor of the communication session, and convey the second real time floor control message to the gateway.

15. The user communication device of claim 14, wherein the signal processing unit further is configured to receive a Real Time Protocol Internet Protocol (RTP IP) packet and extract a speaker arbitration command from the received RTP IP packet.

16. The user communication device of claim 15, wherein the extracted speaker arbitration command grants a reservation of a floor of the communication session.

17. The user communication device of claim 14, wherein the signal processing unit is configured to add a header extension to the first Real Time Protocol Internet Protocol packet and embeds the speaker arbitration command in the header extension 18. A mobile user communication device capable of engaging in speaker arbitration during a dispatch communication session involving multiple participants, the user communication device comprising a signal processing unit that is configured to assemble a first Real Time Protocol (RIP) Internet Protocol (IP) packet, embed a real time speaker arbitration command to request a floor of the communication session in the first RIP IP packet to produce a first real time floor control message, convey the first real time floor control message to a gateway, receive a second RIP IP packet from the gateway that contains an arbitration command comprising an identity of a user communication device and that grants a reservation of the floor, in response to receiving the second RIP IP packet, convey user information to the gateway, when finished transmitting user information to the gateway, assemble a third RIP IP packet and embed a second speaker arbitration command in the third RIP IP packet to produce a second real time floor control message that relinquishes a reservation of a floor of the communication session, and convey the second real time floor control message to the gateway.

19. The user communication device of claim 18, wherein the signal processing unit further is configured to assemble the first Real Time Protocol Internet Protocol packet in response to receiving a request to reserve the floor of the communication session.

20. The user communication device of claim 19, wherein the signal processing unit further is configured to assemble the third RIP IP packet in response to an indication of a desire to release the floor reservation.

21. The user communication device of claim 18, wherein the received Real Time Protocol Internet Protocol packet acknowledges the first real time floor control message.

22. The user communication device of claim 18, wherein the signal processing unit is configured to add a header extension to the first Real Time Protocol Internet Protocol packet and embed the speaker arbitration command in the header extension.

23. The user communication device of claim 18, where the first Real Time Protocol Internet Protocol packet is a Real Time Protocol data packet.

24. The user communication device of claim 18, where the first Real Time Protocol Internet Protocol packet includes voice samples.

25. The user communication device of claim 18, wherein the signal processing unit is configured to add a header extension to the first Real Time Protocol Internet Protocol packet and embeds the speaker arbitration command in the header extension.

* * * * *